Patented July 7, 1942

2,288,749

UNITED STATES PATENT OFFICE 2,288,749

PURIFICATION OF HYDROCARBONS

Walter A. Schulze, Bartlesville, Okla., assignor to Phillips Petroleum Company, a corporation of Delaware No Drawing. Application March 28, 1940, Serial No. 326,503

7 Claims. (Cl. 23—3)

The present invention relates to the treatment of hydrocarbon gases for the removal of hydrogen sulfide.

More specifically the invention includes as a feature the selective removal of the hydrogen sulfide in the presence of other acidic gaseous impurities.

The presence of hydrogen sulfide in natural gas and other hydrocarbon gases such as those associated with the production and refining of crude petroleum oil is objectionable from the standpoint of many domestic and industrial uses, and the removal of hydrogen sulfide from said gases is a matter of long recognized economic importance.

Heretofore the majority of processes for the removal of hydrogen sulfide from gases have been based on two fundamental reactions, namely the action of metals and/or metal salts in solid form to fix hydrogen sulfide as metal sulfides, and the action of alkalide reagents or solutions to form salts with the acidic hydrogen sulfide. The first mentioned type involves either discarding the spent reagent or else regeneration by relatively expensive and inefficient means. The second type of removal process usually includes a regeneration cycle wherein absorbed hydrogen sulfide at least partially displaced from the alkaline reagent by conventional means to prepare said reagent for further use.

The outstanding weakness of such processes utilizing alkaline reagents is that equilibrium conditions in the absorption reaction prevent complete removal of hydrogen sulfide, and that the alkaline reagent is even more reactive toward other acidic constituents of gases such as carbon dioxide. Thus, the presence of carbon dioxide in a gas to be treated by an alkaline reagent results in spending of the reagent thereby, and even eventual displacement of absorbed hydrogen sulfide by the stronger acid anhydride. Further, regenerative steps which are successful in driving out absorbed hydrogen sulfide may not displace carbon dioxide, which results in at least an alteration of the absorbent properties of the reagent if not actually rendering said reagent unsuitable for further use in removing hydrogen sulfide.

Carbon dioxide is almost always found in varying quantities in natural gas. In some localities such as certain New Mexico fields, the gas produced is substantially pure carbon dioxide which is utilized for the manufacture of dry ice. While this is an extreme case, the gas produced in many parts of New Mexico, West Texas and generally throughout the Mid-Continent area contains from 0.1 to 5 or more volumes per cent of carbon dioxide. Also in many instances, carbon dioxide is introduced during certain processing steps in the extraction of natural gasoline from natural gas and this carbon dioxide must be dealt with in subsequent purification steps. These gases frequently contain only a relatively small quantity of hydrogen sulfide but, due to the large amount of carbon dioxide present, the cost of purification on the gases has become almost prohibitive. For example, in the transportation of natural gas by pipeline the carbon dioxide is not harmful but the hydrogen sulfide is extremely corrosive and must be removed. Thus, selective removal of hydrogen sulfide is of great economic importance, but processes used heretofore do not have the desired selectivity.

The present invention offers specific advantages over the previous reagents comprising metal salts, and since it effects complete removal of hydrogen sulfide without reacting appreciably with other acidic constituents of gases being treated, said invention is likewise an improvement on existing processes which utilize alkaline reagents and/or solutions.

An important object of the present invention is to provide a process for the economical removal of hydrogen sulfide from hydrocarbon gases including complete removal of desired.

A further important object of the present invention is to provide a process for the selective removal of hydrogen sulfide from hydrocarbon gases containing other acidic gaseous impurities.

It has been discovered that excellent results may be obtained in completely removing hydrogen sulfide from hydrocarbon gases by passing the raw gases at suitable flow rates over a new type of adsorbent reagent which combines the advantages of a large area of active surface with small resistance to flow of the gases. Said reagent removes hydrogen sulfide by chemical reaction therewith of an adsorbed metal salt to form metal sulfides, so that removal is complete. However, because of the dispersion of the metal salt solution in small increments on a very large area of exposed surface, the disadvantages of mechanical interference are avoided because the reaction product cannot blanket large amounts of unconverted reagent, and more efficient utilization results.

Besides the aforementioned mechanical advantages, the added benefit of selective reaction with hydrogen sulfide when accompanied by other acidic gases is a feature of this new reagent, and is made possible by maintaining a suitable pH in the adsorbed metal salt solution.

The reagent may be prepared by impregnating a suitable adsorbent carrier material such as fuller's earth, activated aluminas, pumice, bauxite, or other well known adsorbent clay-type minerals with a water solution of a metal salt capable of precipitating the corresponding metal sulfide in an acidic reaction medium. Suitable metal salts for the reagent may be chosen on the basis of the water solubility of the corresponding metal sulfides. Thus, only the more insoluble metal sulfides classically grouped and described as the "acid sulfide group" may be precipitated in relatively strong acidic solutions, and thus, only salts of the metals of said group are suitable for the present invention. Further, even some of the metals thus included require a controlled pH of not lower than about 1 to allow precipitation of the sulfide and such control of the pH of the adsorbed metal salt solution within definite limits is a further feature of this invention. The metals whose salts are especially suitable for use in preparing the reagent are silver, mercury (mercuric state) copper, cadmium and lead, since the sulfides of these metals will form in solutions having a pH between 1 and 3. The upper limit of allowable pH in the reagent solution is determined by the value necessary to prevent reaction between said metal salt solutions and carbon dioxide and/or other acidic gases which are not to be removed from the gas.

The impregnation is accomplished by spraying a metal salt solution of proper concentration and containing sufficient mineral acid to give the desired pH onto an adsorbent carrier and allowing excess water, if present, to evaporate, but maintaining an aqueous solution phase on said carrier. If the carrier material is dehydrated prior to impregnation, it will immediately appear dry, and the proper percentage of water will be easily obtained.

When gas containing hydrogen sulfide is passed over a bed of reagent prepared in the above-described manner, reaction occurs in the adsorbed aqueous phase to produce metal sulfides, while other constituents of the gas pass through unchanged. By such a process, the metal salt consumed corresponds substantially to the amount sprayed onto the carrier, because the uniform dispersion aids in obtaining complete utilization. After the reagent is spent to the point where hydrogen sulfide is no longer completely removed, the metal salt may be reclaimed from the sulfide form by suitable means or, since the actual weight of salt so consumed is only a fraction of the total weight of the reagent, a new bed may be supplied without involving an exorbitant chemical cost.

Thus, the present reagent is superior to such reagents as iron-oxide boxes, masses of metals and/or metal oxides and similar arrangements of solid metal salts in that when the latter become inactive due to a particle-coating of sulfide, the amount of reagent involved demands an expensive and cumbersome handling and regeneration operation. Further, the regeneration of old-type reagents may involve conditions such as extremely high temperatures which impair the physical characteristics and eventually cause such to be discarded.

On the other hand, the superior reagent of the present invention may be regenerated in situ without fusing or sintering, or if desired, additional metal salt solution may be placed on the carrier as long as its adsorbent powers are unimpaired.

In operating according to the present invention, precaution must be taken to avoid alteration of the water content of the adsorbed salt solution beyond certain limits. Thus, excess water may be deposited on the reagent when a raw gas of high water content is being treated; such deposition of water may eventually wet the reagent to such an extent that solution will drain off the carrier. At the other extreme, treating a very dry gas may dry out the reagent until it becomes relatively inactive in the absence of an aqueous phase. If the water content of the raw gas is regulated to result in substantially equilibrium conditions in the reagent bed, no adjustment of the water content of the reagent solution will be necessary, since no water is formed by the removal reaction.

The temperatures at which the present invention may be used are ordinary atmospheric temperatures between 40 and 110° F., although higher temperatures up to about 200° F. may be employed if desired, providing the water content of the reagent is maintained. Temperatures low enough to cause freezing of the reagent interfere with the process and ruin the reagent.

Pressures for the process may be atmospheric or superatmospheric. In general, the pressure will depend on the type of equipment and the raw gas pressure. In this connection it should be noted that high pressures favor the deposition of water on the reagent, and this action should be controlled by suitable means.

Flow rates of raw gas through the present reagent may be adjusted to maximum values allowing complete removal of hydrogen sulfide, or such values thereunder, as the installation requires.

The following example will further illustrate the operation of this invention, but since various applications and modifications will be apparent in view of the foregoing discussion, no limitation on the scope of the invention is implied.

*Example*

A natural gas from a Texas field was found to contain 1.5 volume per cent of carbon dioxide and 10 grains of hydrogen sulfide per 100 cubic feet. Complete desulfurization in the presence of this carbon dioxide was accomplished by the present invention.

The reagent was prepared by impregnating dehydrated fuller's earth with a water solution of cupric sulfate containing sufficient sulfuric acid to yield a pH of 1. The resulting reagent contained 8 per cent by weight of cupric sulfate and 12 per cent by weight of water. This reagent was disposed in a vertical tower, and the raw gas was passed through said tower at a rate equivalent to 10,000 cubic feet per ton of reagent per hour. Reagents containing between 1 and 15 per cent of cupric sulfate by weight may be prepared and utilized in a similar manner.

The effluent gas was free of hydrogen sulfide, and the duration of this complete removal corresponded to about 95 per cent utilization of the applied cupric salt. When spent, the reagent was subjected to air oxidation, heated to expel sulfur compounds, and rejuvenated with a fresh application of excess sulfuric acid and cupric sulfate, the excess acid being used to convert the cupric oxide formed back to cupric sulfate. Thus, only a small amount of this salt had to be supplied to restore the original concentration.

Metal salts which are useful in the present invention includes particularly copper, lead and cadmium salts, since the others of the previously defined group are relatively too expensive for commercial use. Choice of metal salts and optimum pH for the salt solution are matters well understood by those skilled in this art. For example, when using a copper salt reagent, a pH of 1 is satisfactory, but when using a lead salt, a pH of 3 is preferable to insure precipitation of lead sulfide.

Mineral acids useful in preparing the present reagent are those which are substantially non-volatile and do not form insoluble salts with the metal ion in the reagent solution, and with strength or ionization such that the desired pH range is readily obtained.

The present invention will be observed to have particular applicability to treating gases of relatively small hydrogen sulfide concentration whether said small concentration represents the original amount present in a gas or the residual amount unremoved by a previously applied purification process. Liquid hydrocarbon oils may be treated, if desired, by filtration over the reagent. The economics governing the application of this invention will be obvious, and should not be construed as limiting the scope thereof.

The invention having been disclosed and exemplified, the following claims are made:

1. The process of treating hydrocarbon gases containing small amounts of hydrogen sulfide along with relatively large amounts of carbon dioxide to remove hydrogen sulfide therefrom which comprises passing said gases at suitable rates over a solid contact reagent comprising an adsorbent material impregnated with an aqueous solution containing a mineral acid and ions of a metal selected from the insoluble sulfide group of copper, cadmium, silver, mercury and lead, said aqueous solution having a pH low enough to prevent precipitation of metal carbonate but sufficient to allow precipitation of metal sulfide and having a water content not appreciably altered during the course of treating, whereby hydrogen sulfide is removed from said gases.

2. The process of treating hydrocarbon gases containing small amounts of hydrogen sulfide along with relatively large amounts of carbon dioxide to remove hydrogen sulfide therefrom which comprises passing said gases at suitable rates over a solid contact reagent comprising an adsorbent material impregnated with an aqueous solution containing a mineral acid and ions of a metal selected from the insoluble sulfide group of copper, cadmium, silver, mercury and lead, said aqueous solution having a pH between about 1 and about 3 and having a water content not appreciably altered during the course of treating, whereby the hydrogen sulfide is removed from said gases.

3. The process of selectively removing hydrogen sulfide from hydrocarbon gases containing small amounts of same in company with relatively large amounts of carbon dioxide, which comprises passing said gases at suitable rates over a solid contact reagent comprising an adsorbent material impregnated with an aqueous solution containing a mineral acid and ions of a metal selected from the insoluble sulfide group of copper, cadmium, silver, mercury and lead, said solution having a pH low enough to prevent precipitation of metal carbonate while allowing precipitation of metal sulfide and having a water content not appreciably altered during the course of treatment, whereby the hydrogen sulfide in said hydrocarbon gases is removed as metal sulfide without any substantial removal of carbon dioxide from said gases.

4. The process of treating hydrocarbon gases containing small amounts of hydrogen sulfide along with relatively large amounts of carbon dioxide to remove hydrogen sulfide therefrom which comprises passing said gases at suitable rates over a solid contact reagent comprising an adsorbent carrier impregnated with an aqueous solution containing a mineral acid and a salt of a metal selected from the insoluble sulfide group of copper, cadmium, silver, mercury and lead, said solution having a pH low enough to prevent precipitation of metal carbonate while allowing precipitation of metal sulfide and having a substantially maintained water content not exceeding the adsorptive capacity of the carrier, whereby hydrogen sulfide is removed from said gases.

5. A process as in claim 4 wherein the metal salt is cupric sulfate and the mineral acid is sulfuric acid.

6. The process of treating hydrocarbon gases containing small amounts of hydrogen sulfide along with relatively large amounts of other gaseous acid anhydrides to remove hydrogen sulfide therefrom which comprises passing said gases at suitable rates over a solid contact reagent comprising an adsorbent carrier impregnated with an aqueous solution of a water-soluble salt of a metal chosen from the insoluble sulfide group of copper, cadmium, silver, mercury and lead, said solution containing sufficient added mineral acid to result in a pH between about 1 and about 3 and having a substantially maintained water content not exceeding the adsorptive capacity of said carrier, whereby hydrogen sulfide is selectively removed.

7. A process as in claim 6 wherein the reagent comprises fuller's earth impregnated with an acid aqueous solution of cupric sulfate and sulfuric acid in a quantity sufficient to result in a cupric sulfate concentration of between 1 and 15 per cent by weight of said reagent.

WALTER A. SCHULZE.